United States Patent [19]
Ohmika et al.

[11] Patent Number: 6,073,719
[45] Date of Patent: Jun. 13, 2000

[54] BODY STRUCTURE OF A LOW FLOOR MOTORCYCLE

[75] Inventors: Yasushi Ohmika; Nobuyuki Kondou, both of Saitama, Japan

[73] Assignee: Honda Giken Kogyo Kabushiki Kaisha, Tokyo, Japan

[21] Appl. No.: 09/163,425

[22] Filed: Sep. 30, 1998

[51] Int. Cl.[7] .............................. B62D 61/02; B60K 1/00
[52] U.S. Cl. .......................................... 180/219; 180/291
[58] Field of Search .................................. 180/219, 291, 180/311, 312

[56] References Cited

U.S. PATENT DOCUMENTS

| | | | |
|---|---|---|---|
| 4,694,929 | 9/1987 | Sugimoto | 180/311 |
| 4,721,178 | 1/1988 | Ito | 180/215 |
| 4,742,884 | 5/1988 | Ishikawa | 180/219 |
| 4,796,719 | 1/1989 | Shiratsuchi | 180/219 |
| 4,828,069 | 5/1989 | Hatsuyama | 180/219 |
| 4,903,483 | 2/1990 | Atsuumi et al. | 60/313 |
| 4,923,026 | 5/1990 | Shimoyama et al. | 180/215 |
| 4,964,483 | 10/1990 | Yokoyama et al. | 180/219 |
| 5,094,315 | 3/1992 | Taki et al. | 180/219 |
| 5,433,286 | 7/1995 | Kumamaru et al. | 180/219 |
| 5,782,313 | 7/1998 | Kurawaki et al. | 180/219 |

FOREIGN PATENT DOCUMENTS

| | | |
|---|---|---|
| 37-16106 | 10/1962 | Japan . |
| 2-88382 | 3/1990 | Japan . |
| 2593868 | 12/1996 | Japan . |

OTHER PUBLICATIONS

Kamiyama, Japan, Application No. 59–193859, Nov. 1992.

*Primary Examiner*—J. J. Swann
*Assistant Examiner*—Christopher Bottorff
*Attorney, Agent, or Firm*—Birch, Stewart, Kolasch & Birch, LLP

[57] ABSTRACT

A motorcycle, such as a scooter, includes a frame structure and arrangement of component parts which allows the footboards of the motorcycle to be lowered, enlarged and lengthened. The overall frame of a motorcycle includes a front frame portion and a rear frame portion. The front frame portion is connected to an engine of the motorcycle and the rear frame portion is connected to a transmission casing of the motorcycle. In a first embodiment, the front and rear frames are not directly connected together. In a second embodiment, the front and rear frames are connected together. By using the engine and transmission casing as components of the overall motorcycle frame in both the first and second embodiments, more flexibility is gained in the design and layout of the motorcycle's body cover and footboards. Particularly, the footboards may be lowered, enlarged and lengthened so as to improve the riding comfort of the operator and passenger of the motorcycle.

20 Claims, 16 Drawing Sheets

BODY STRUCTURE OF A LOW FLOOR MOTORCYCLE

BACKGROUND OF THE INVENTION

1. Field of the Invention

This invention relates to a body structure of a motorcycle such as a scooter. More particularly, an overall frame of the motorcycle includes a front frame and a rear frame, which are respectively attached to a horizontally opposed engine and a transmission casing. By using the engine and transmission casing in the frame structure, there exists room for enlarging and lowering footboards along the bottom of the motorcycle's body structure.

2. Description of the Relevant Art

Generally, body structures of motorcycles are classified into ordinary body structures, and scooter type body structures. Japanese Patent No. 2593868 illustrates the ordinary body structure which characteristically includes a body frame wherein a front and rear portion of the body frame are directly coupled. An engine is suspended from the body frame using an engine hanger.

The scooter type body structure can be similar to the ordinary body structure, but with different shapes and details. One such scooter type body structure, as illustrated in Japanese Patent Publication No. Sho 37-16106, is a so-called monocoque body. In the monocoque, an engine and a swing arm supporting a rear wheel are attached to the body frame.

The ordinary body structure suffers drawbacks. If the front and rear portions of the frame are directly coupled, as in Japanese Patent No. 2593868, a joint between the front and rear frames or a rear end of the front frame is positioned at the center of the motorcycle, i.e., where footboards have to be provided. Therefore, the footboards will not have sufficient space because they are adversely affected by the front or rear frame. Further, the front or rear frames exist in a floor tunnel between the footboards, which the rider must step over when mounting or dismounting the motorcycle. The presence of the front or rear frames requires that the floor tunnel be made large in height, which makes it difficult for the rider to step over the tunnel area smoothly. This is not preferable in a scooter. A scooter should feature easy mounting and dismounting accomplished by use of the low footboards.

The monocoque body also suffers drawbacks. The monocoque body of Patent Publication No. Sho 37-16106 must be constructed by a special process. Components defining the profile of the motorcycle have to be produced by press-molding steel plates. Press-molded components must have complicated structures in order to maintain rigidity. Further, the number of components is increased, and complicated welding processes are necessary for the increased number of parts. This means that a manufacturing process becomes complicated and expensive, and the weight of the body is relatively heavier. In order to overcome the foregoing problem, a motorcycle usually includes a frame made of metallic pipes, which are joined and welded, and a body defining the profile of the motorcycle is made of molded resin.

SUMMARY OF THE INVENTION

The present invention has been contemplated by the inventors in order to overcome the foregoing problems of the related art. The present invention provides a body structure of a low floor motorcycle, in which the footboards are low and large enough to assure easy operation of the motorcycle, and to enable the rider to put his or her feet comfortably thereon. Further, the rider may step over the floor tunnel smoothly, thereby improving the ease of mounting and dismounting the motorcycle.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
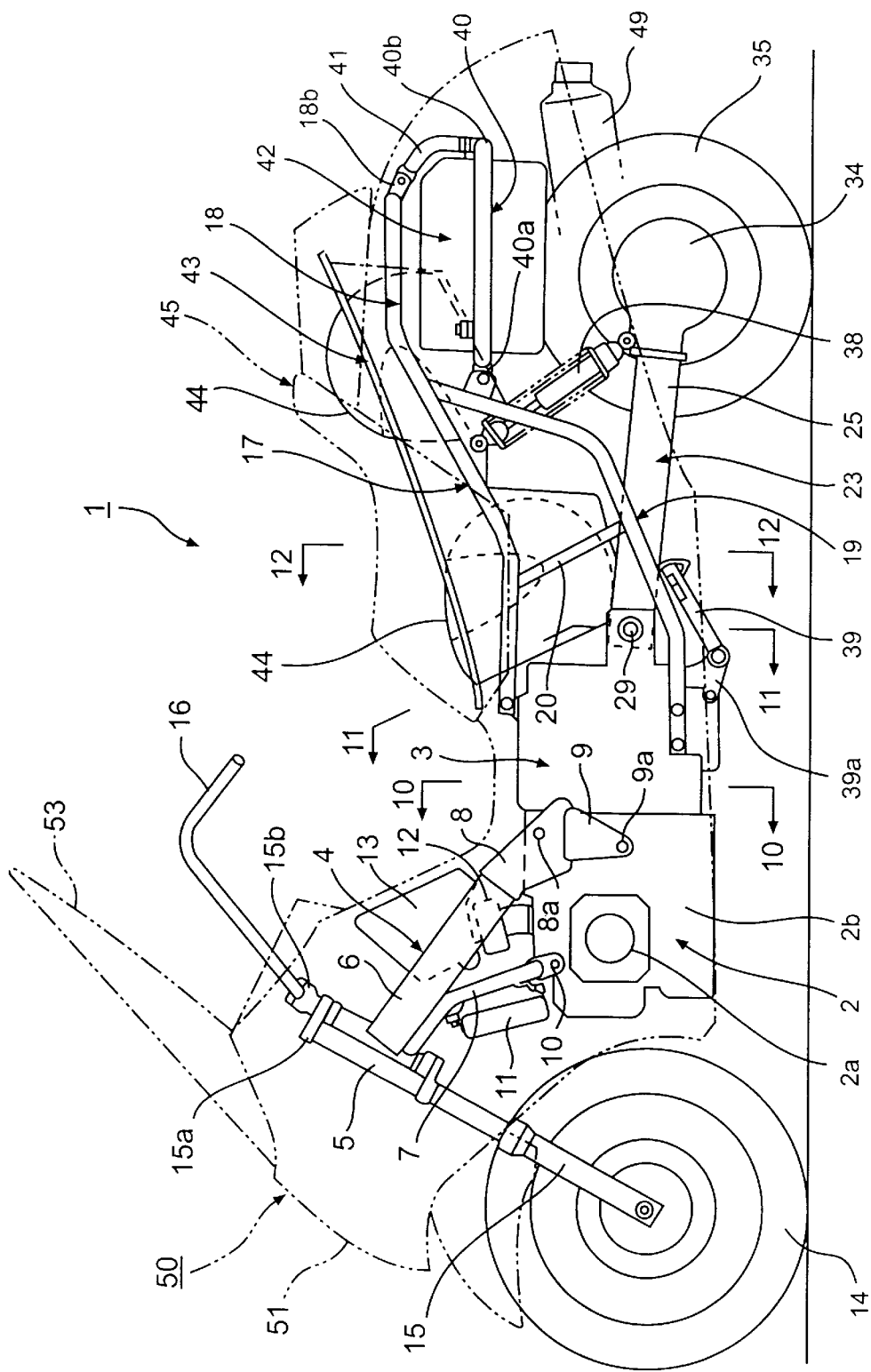
FIG. 1 is a side view of a low floor motorcycle in accordance with the present invention.

As illustrated in FIG. 1, an engine 2 is arranged between front and middle parts of the motorcycle 1. The engine 2 is a water-cooled and horizontally opposed engine. Cylinder portions 2a are located on opposing sides of a rectangular engine body 2b housing a crankcase. The cylinder portions 2a are substantially horizontal, extending along the width of the motorcycle 1.

A substantially rectangular transmission casing 3 is coupled to a rear end of the engine body 2b, and extends behind the engine 2 as an integral member thereof. The engine 2 and transmission casing 3 constitute a power unit, and serve as a part of the body of the motorcycle 1, as will be described hereinafter.

Figure 2:
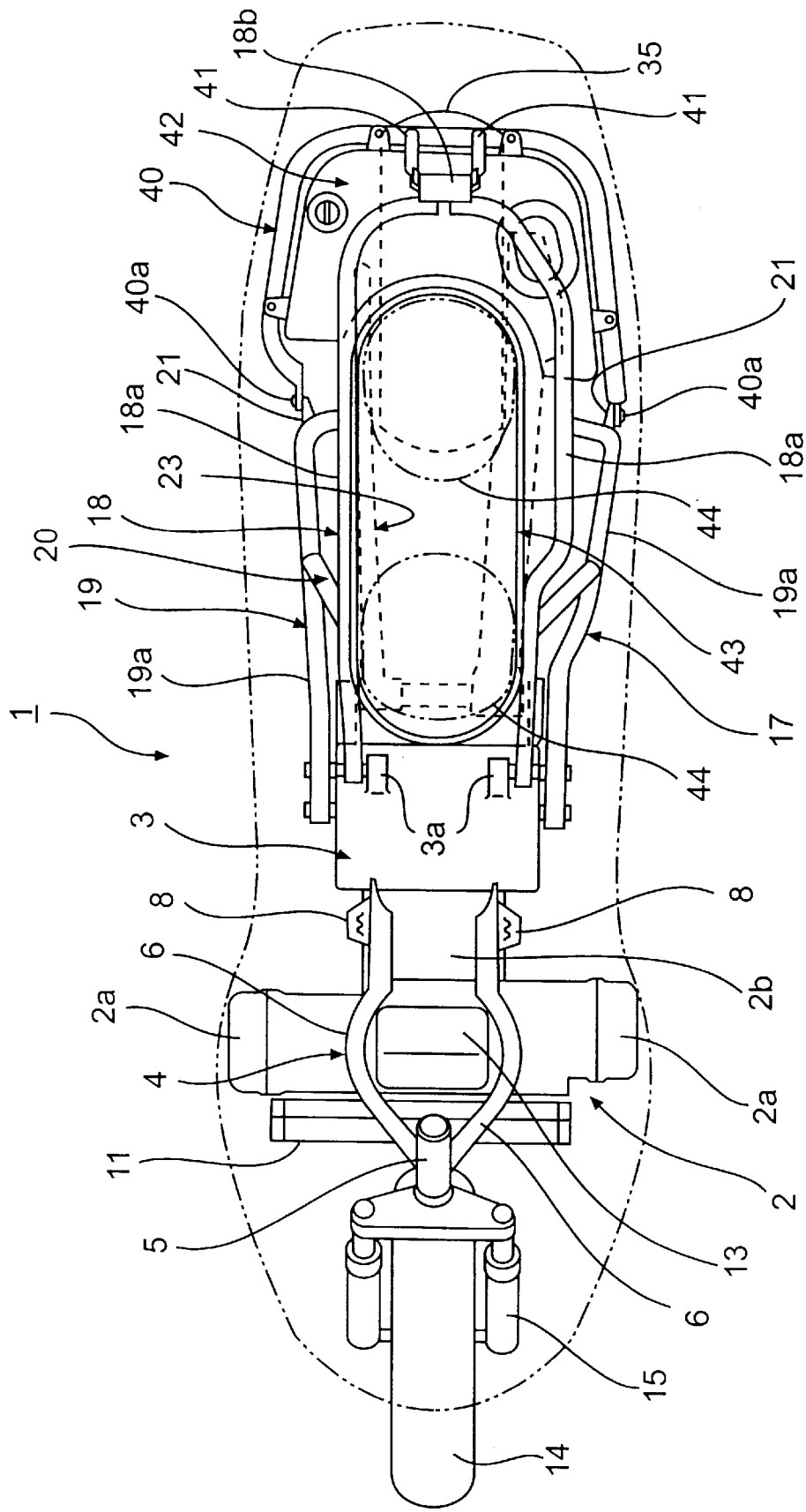
FIG. 2 is an overhead view of the motorcycle in FIG. 1.
Figure 4:
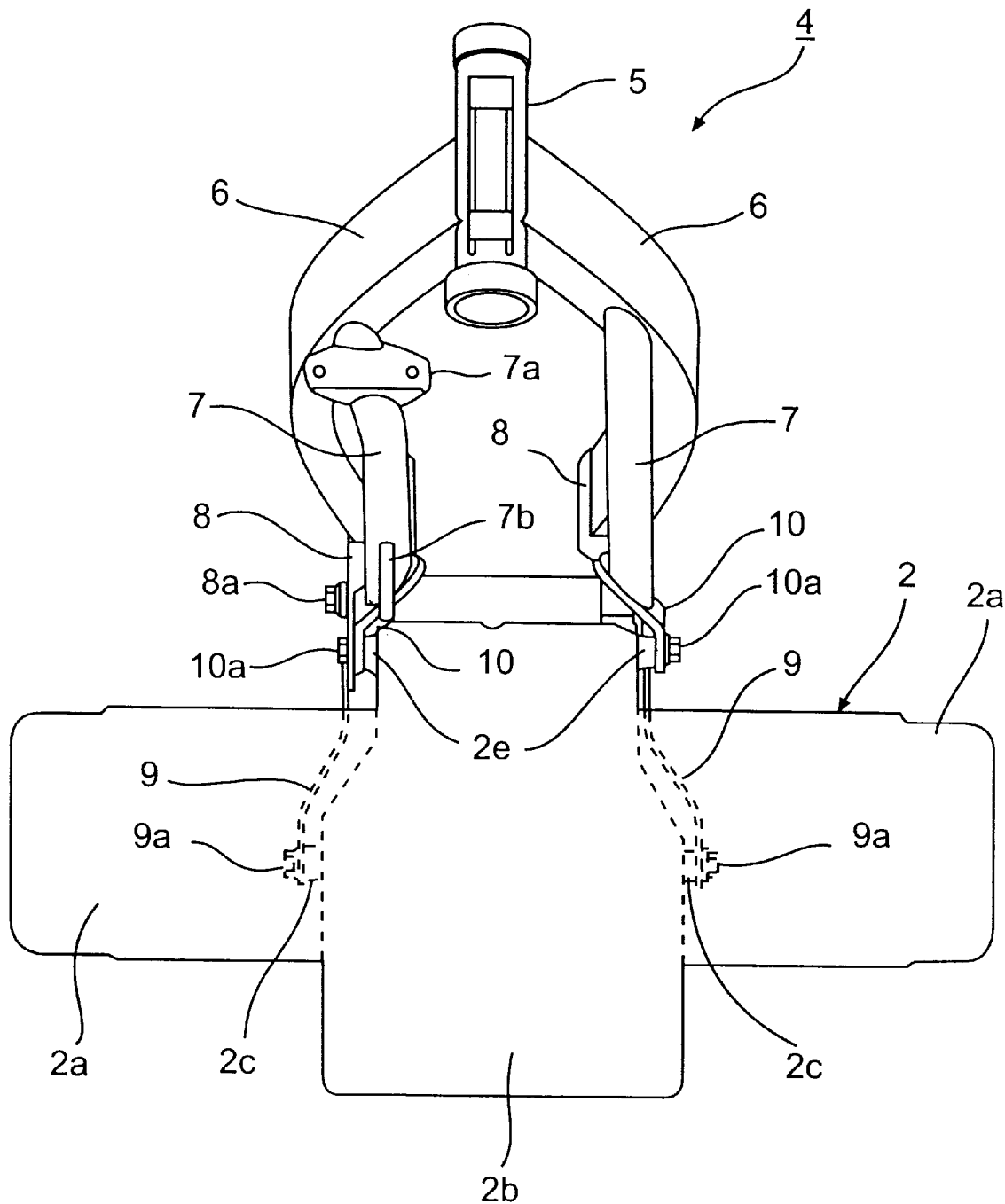
FIG. 4 is a front view of the forward frame of FIG. 3.

A front frame 4 of the body of the motorcycle 1 includes a head pipe 5 at a front end of the motorcycle. The front frame 4 also includes a pair of left and right main pipes 6 obliquely extending from a rear lower half of the head pipe 5, and a pair of left and right down tubes 7 extending obliquely downward from the bottom of the main pipes 6. The main pipes 6 are made of long square pipes, and have front ends thereof welded to the head pipe 5. As illustrated in FIGS. 2 and 4, the main pipes 6 are curved outward at their center portions. The down tubes 7 are substantially parallel to each other, and bent at their center portions in order to extend downwards.

Two engine brackets 8 are attached to rear ends of the left and right main pipes 6. Respective engine hangers 9 are coupled to lower ends of the engine brackets 8. The engine hangers 9 are coupled by bolts 9a to a pair of bosses 2c projecting from opposite sides at vertical centers of a rear part 2d of the engine body 2b. The brackets 8 are, themselves coupled to opposite sides of an upper rear part 2d of the engine body 2b via a pair of bolts 8a. Thus, the main pipes 6, via the rear ends thereof, are attached to and supported by the engine 2.

Figure 3:
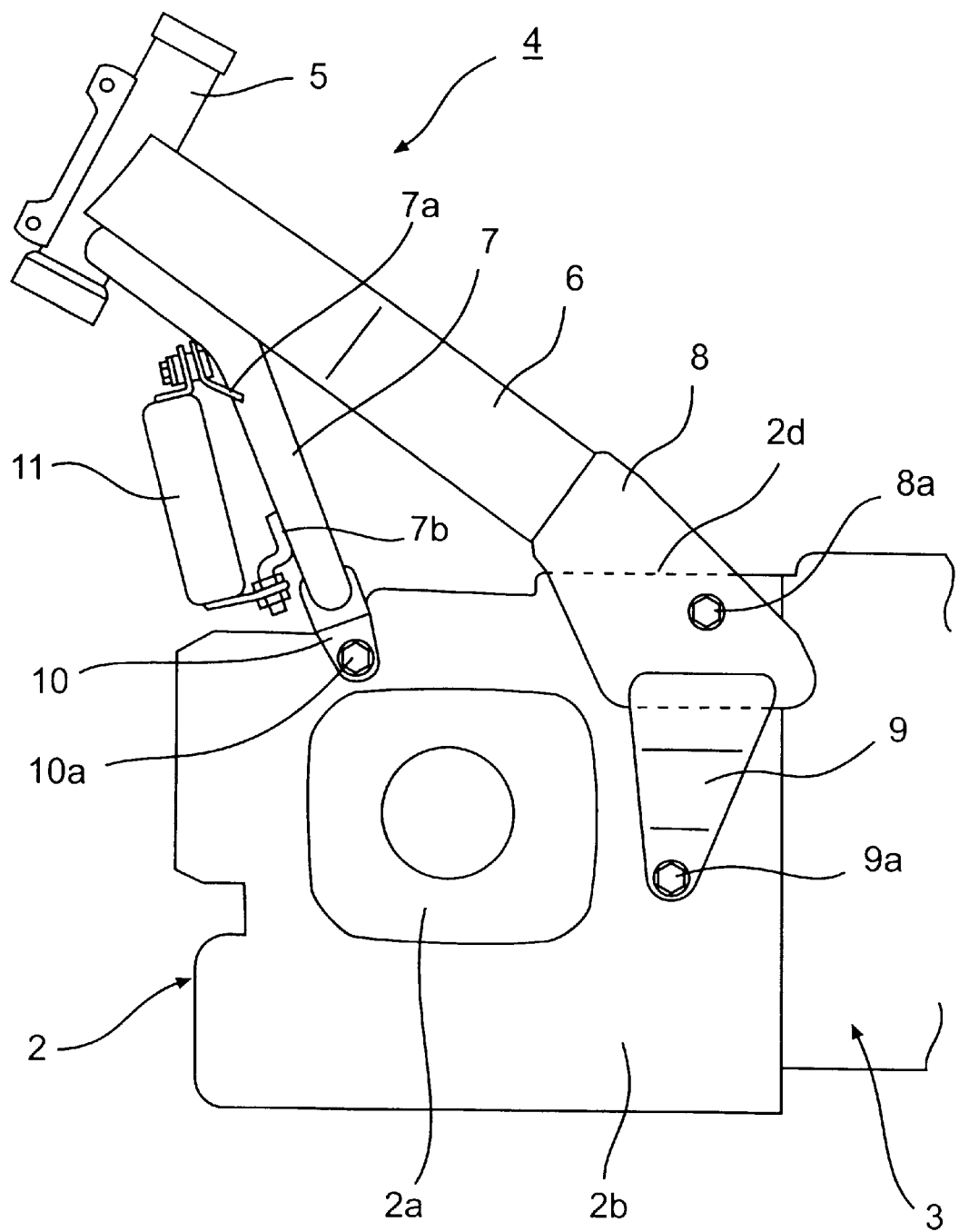
FIG. 3 is a side view of a forward frame of the motorcycle in FIG. 1.

In FIG. 3, the engine hangers 9 are independent from the brackets 8. Alternatively, the engine hangers 9 may be formed as an integral part of the brackets 8. Further, the lower ends of the main pipes 6 may be pressed into the shape of the brackets 8, and coupled to the engine body 2b.

A pair of mounting brackets 10 are provided behind the left and right down tubes 7 at the front part of the motorcycle 1. The brackets 10 are coupled, via bolts 10a, to a pair of left and right bosses 2e at an upper front part of the engine body 2b, and the down tubes 7 are attached to and supported by the engine 2.

In the front frame 4, configured as described above, the main pipes 6 extend downward and rearward toward the engine 2, and are coupled at rear ends thereof to the engine 2. The main pipes 6 neither extend rearward from the rear end of the engine, nor project over the engine 1, and the engine 2 constitutes a part of the front frame 4.

An engine-cooling radiator 11 is supported under the down tubes 7 using a pair of stays 7a provided in front of the down tubes 7. A carburetor 12 including a throttle valve unit constituting a fuel supply is disposed above the center of the engine body 2b and between the main pipes 6. An air cleaner 13 is arranged above the carburetor 12 in order to communicate with the carburetor 12.

The head pipe 5 constituting the front end of the front frame 4 supports a front fork 15 in such a manner that the front fork 15 can turn. A steering handle bar 16 is attached to a top bridge 15a of the front fork 15, and extends across the motorcycle 1. The steering handle bar 16 is operated in order to steer the front wheel 14.

Figure 5:
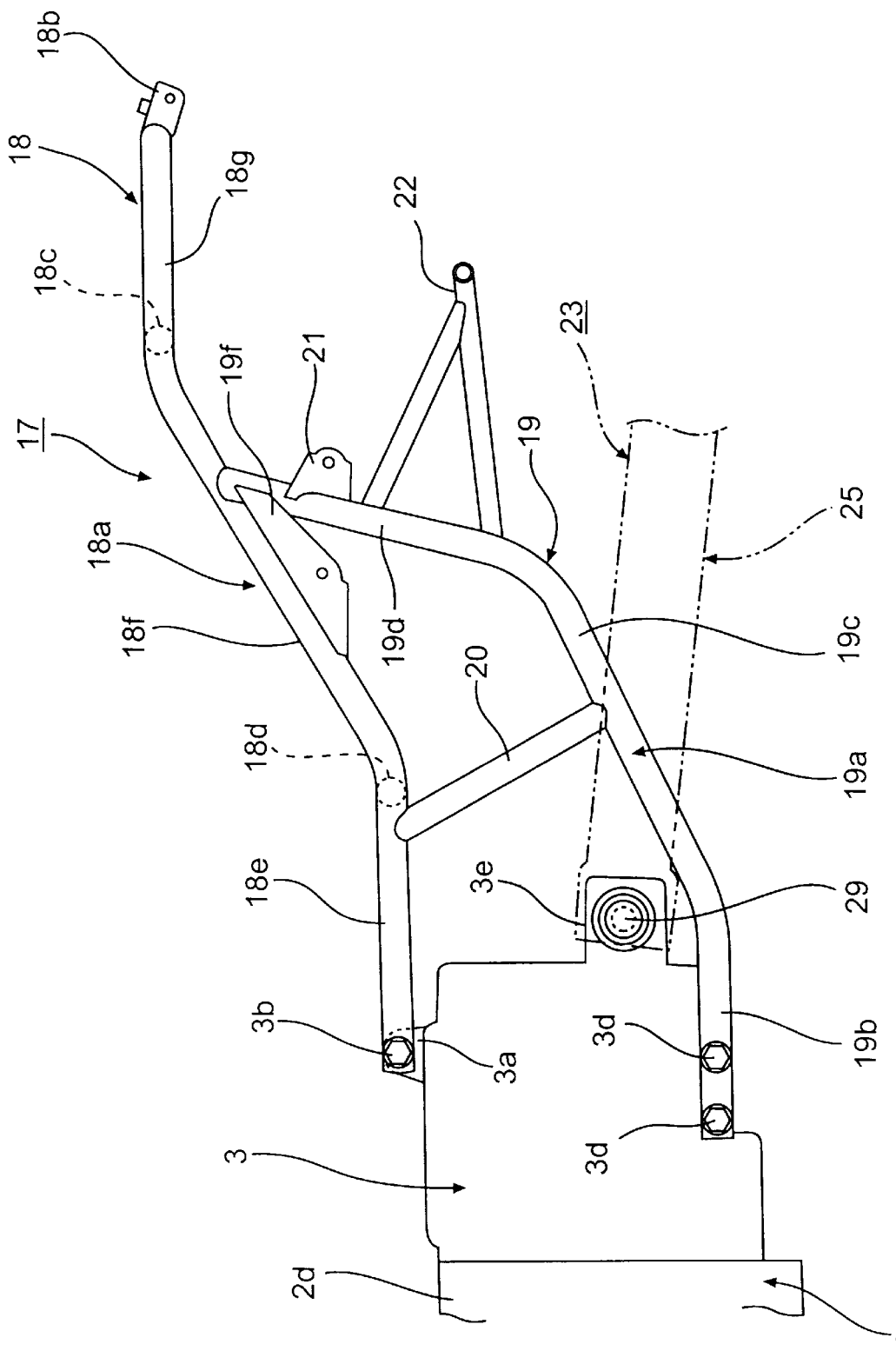
FIG. 5 is a side view of a rear frame of the motorcycle in FIG. 1.
Figure 6:
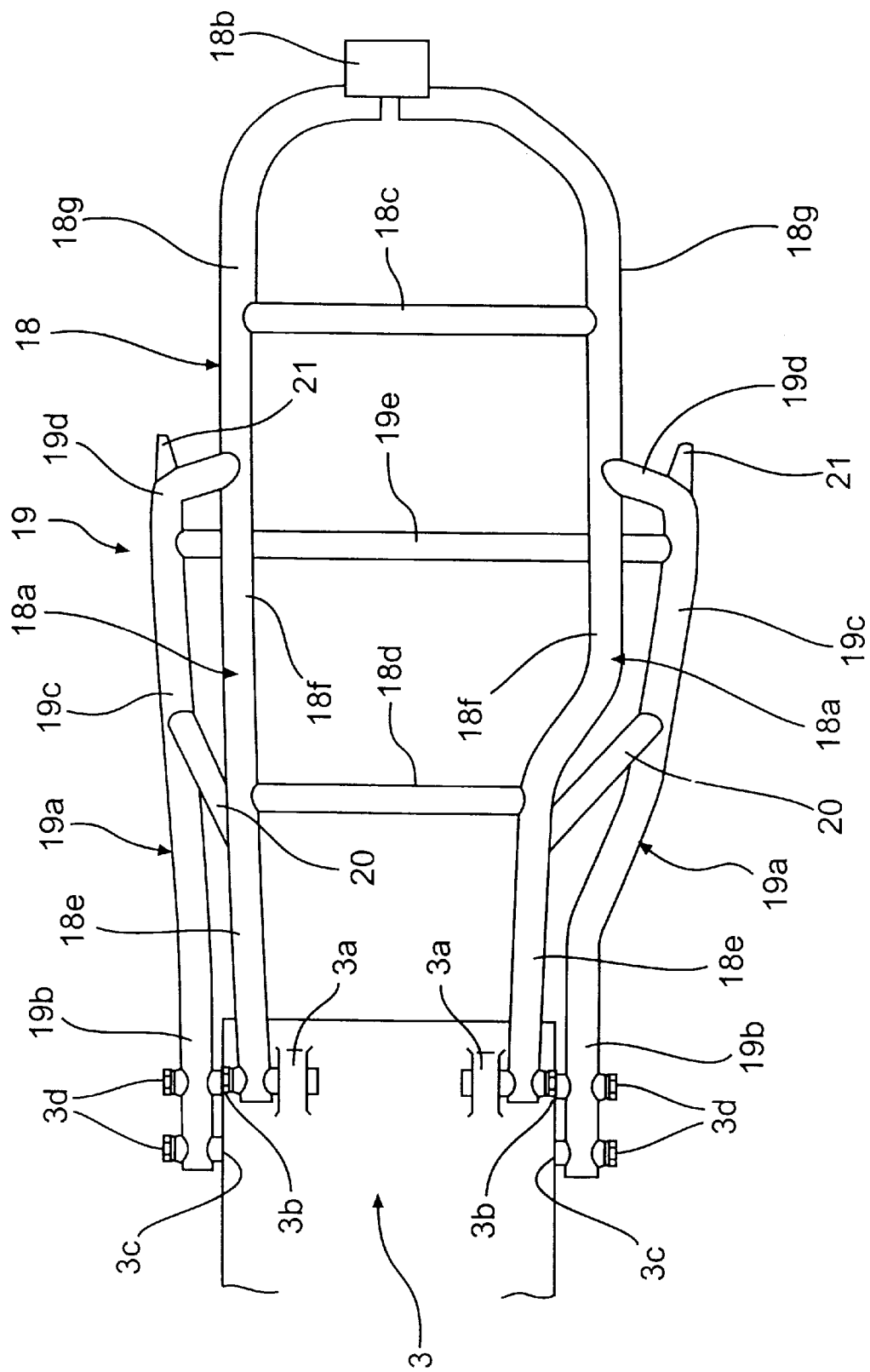
FIG. 6 is an overhead view of the rear frame in FIG. 5.

The structure of a rear frame 17, in accordance with a first embodiment, will be described with reference to FIGS. 5 and 6. The rear frame 17 includes an upper sub-frame 18 substantially in the shape of inverted letter U having an open front end, as shown in FIG. 6. The upper sub-frame 18 includes a pair of left and right members 18a which are curved inward so as to confront each other at their rear ends, and are coupled via a rear piece 18b.

In this embodiment, one of the members 18a bulges between its center and rear part toward one side edge of the motorcycle 1, as shown in FIG. 6. Cross members 18c and 18d are arranged across the members 18a substantially at the front and rear parts thereof. Referring to FIG. 5, the upper sub-frame 18 is shaped such that the members 18a are at a low level and substantially horizontal at front parts 18e thereof, are inclined upward and rearward at center parts 18f thereof, and are substantially horizontal at rear parts 18g thereof.

A lower sub-frame 19 constituting a lower part of the rear frame 17 includes a pair of left and right members 19a. Referring to FIG. 5, the members 19a are substantially in the shape of letter L having an obtuse angle and front parts 19b. Front parts 19b are vertically spaced apart from the front parts 18e of the upper sub-frame 18, and are short and substantially horizontal.

Center parts 19c of members 19a extend upward and rearward, and are welded to the approximate center sections of center parts 18f of the left and right members 18a of the upper sub-frame 18 from underneath. As clearly shown in FIG. 6, one of the members 19a near the bulged portion of the upper sub-frame 18 also bulges outward.

A cross member 19e extends across the members 19a at lower parts thereof. A pair of reinforcing pipes 20 are disposed between the front parts 18e of the upper sub-frame 18 and the center parts 19c of the lower sub-frame 19. The reinforcing pipes 20 extend obliquely forward and upward.

A reinforcing plate 19f is provided between a joint area of the upper sub-frame 18 and lower sub-frame 19, thereby constituting an area to which one end of a buffer (to be described later) is attached. A pair of brackets 21 extend from upper rear parts of the rear parts 19d of the lower sub-frame 19 in order to support a frame for a fuel tank (to be described later). A stay 22 projects from the rear part of the lower sub-frame 19.

A pair of left and right bosses 3a project from the upper rear parts of the transmission casing 3. The bosses 3a are spaced apart. The front edges of the front parts 18e of the left and right members 18a are coupled to the bosses 3a using a pair of bolts 3b. The front edges of the front parts 19b of the left and right members 19a of the lower sub-frame 19 are positioned outside bosses 3c which are at lower opposite sides of the transmission casing 3. The front parts 19b are coupled to the bosses 3c using bolts 3d.

The upper sub-frame 18 and the lower sub-frame 19 constituting the rear frame 17 are coupled at their front ends to the rear part of the transmission casing 3. In other words, the transmission casing 3 constitutes a part of the rear frame body of the motorcycle 1. Further, the engine 2 constitutes a part of the front frame body of the motorcycle 1. The front and rear frames 4 and 17 are separate from each other, and the power unit including the engine 2 and transmission casing 3 forms the center of the overall frame body of the motorcycle 1.

The transmission casing 3 may house an automatic transmission, such as static hydraulic pressure type continuous transmission. Alternatively, the transmission casing 3 may house an electric transmission, and a transmission activator may be provided on a handle grip.

Figure 7:
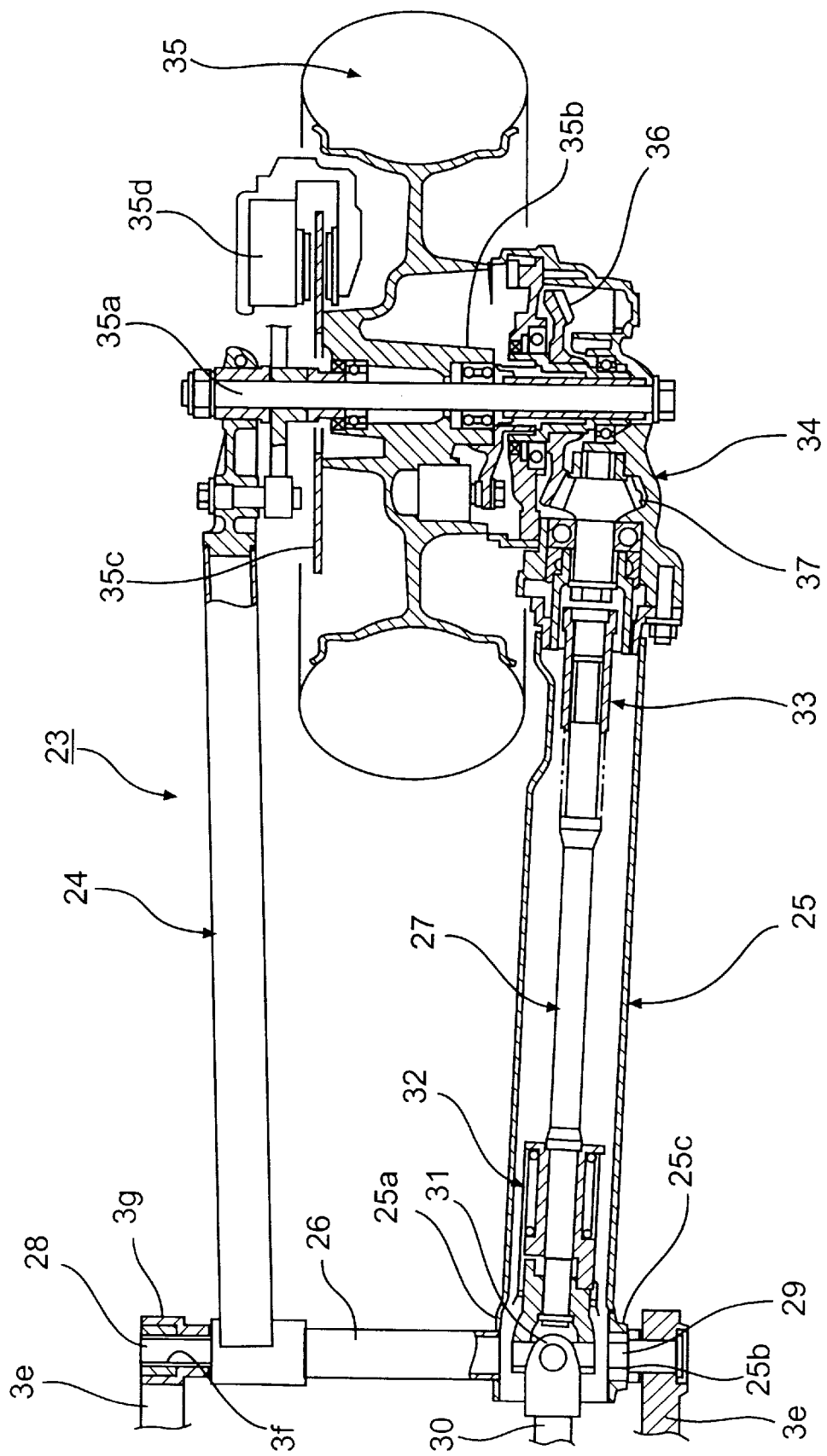
FIG. 7 is an overhead sectional view of a swing arm.

A pair of shaft support bosses 3e are integrally formed at the rear end of the transmission casing 3 in order to support front ends of rear swing arm 23 to which a rear axle is supported. The rear swing arm 23 can swing up and down. The swing arm 23 is structured as shown in FIG. 7. In this embodiment, the rear wheel is driven by a shaft drive mechanism.

In FIG. 7, it is assumed that the motorcycle advances to the left side. Therefore, the swing arm 23 comprises a right swing arm member 24 which actually functions as a swing arm, and a left swing arm member 25 which is constituted by a drive shaft casing through which a drive shaft 27 passes. Hereinafter, reference numeral "25" denotes either the left swing arm member or the drive shaft.

A cross member 26 extends across tips of the left and right swing arm members 24 and 25 in order to make these members operate integrally, and functions as a fulcrum enabling the swinging of the swing arm 23. A support shaft 28 passes through one end of the cross member 26, and is rotatably supported in a shaft hole 3f formed in one of the bosses 25a via a bearing 3g at one end of the cross member 26.

At one end thereof, the swing arm 25 housing the drive shaft casing 27 has a large diameter boss 25a, and a support hollow 25b is formed on the outer surface of the boss 25a, thereby fixing a support shaft 29 to the boss 3e on the transmission casing 3. Therefore, the support shaft 29 is rotatably fitted in the support hollow 25b via a bearing 25c. The swing arm 23 can swing with respect to the transmission casing 3 using, as a fulcrum the stationary shafts 28 and 29 supported by or fixed to the bosses 3e of the transmission casing 3.

A transmission output shaft 30 of the transmission casing 3 is present behind the transmission casing 3 and extends in the vicinity of the drive shaft 27. The rear end of the output shaft 30 is coupled to the front end of the drive shaft 27, housed in a drive shaft casing 25, via a universal joint 31. In FIG. 7, reference numerals 32 and 33 denote torque limiters provided in a shaft drive mechanism.

A gear case 34 is positioned behind the drive shaft case 25 as an integral part. An axle 35a for the rear wheel 35 extends between the gear case 34 and the rear end of the swing arm member 24 opposite to the gear case 34, in order to support the rear wheel 35. A hub 35b of the rear wheel 35 is engaged with a driven gear 36. The driven gear 36 is engaged with a drive gear 37 provided at the rear end of the drive shaft 27. By this arrangement, an output of the output shaft 30 is transmitted to the rear wheel 35 via the drive shaft 27, drive gear 37 and driven gear 36 in order to activate the rear wheel 35. In FIG. 7, reference numeral 35c denotes a brake disc, and reference numeral 35d denotes a brake caliper.

Referring to FIG. 7, a space between the front ends of the swing arm members 24 and 25 is narrower than a space between the rear ends thereof. By this arrangement, the shafts 28 and 29 of the swing arm are arranged inside footboards, as will be described later. Therefore, the footboards can be enlarged along the width of the motorcycle.

As shown in FIG. 1, a shock absorber or buffer 38 constituting a rear cushion unit is arranged between the gear case 34 and the reinforcing plate 19f. Further, a stand bracket 39a is coupled to the lower rear end of the transmission casing 3 in order to support a retractable stand 39.

As shown in FIG. 2, a pair of brackets 21 are provided behind the left and right members 19a of the lower subframe 19. The brackets 21 are coupled with tips 40a in order to support a fuel tank support frame 40. The support frame 40 for supporting a fuel tank 42 is in the shape of an inverted letter U having an open front end. Rear ends 40b of the support frame 40 are coupled to the rear member 18b of the upper sub-frame 18 via left and right stays 41. The rear wheel 35 is fitted, at its upper part, in the U-shaped space of the fuel tank 42.

Figure 13:
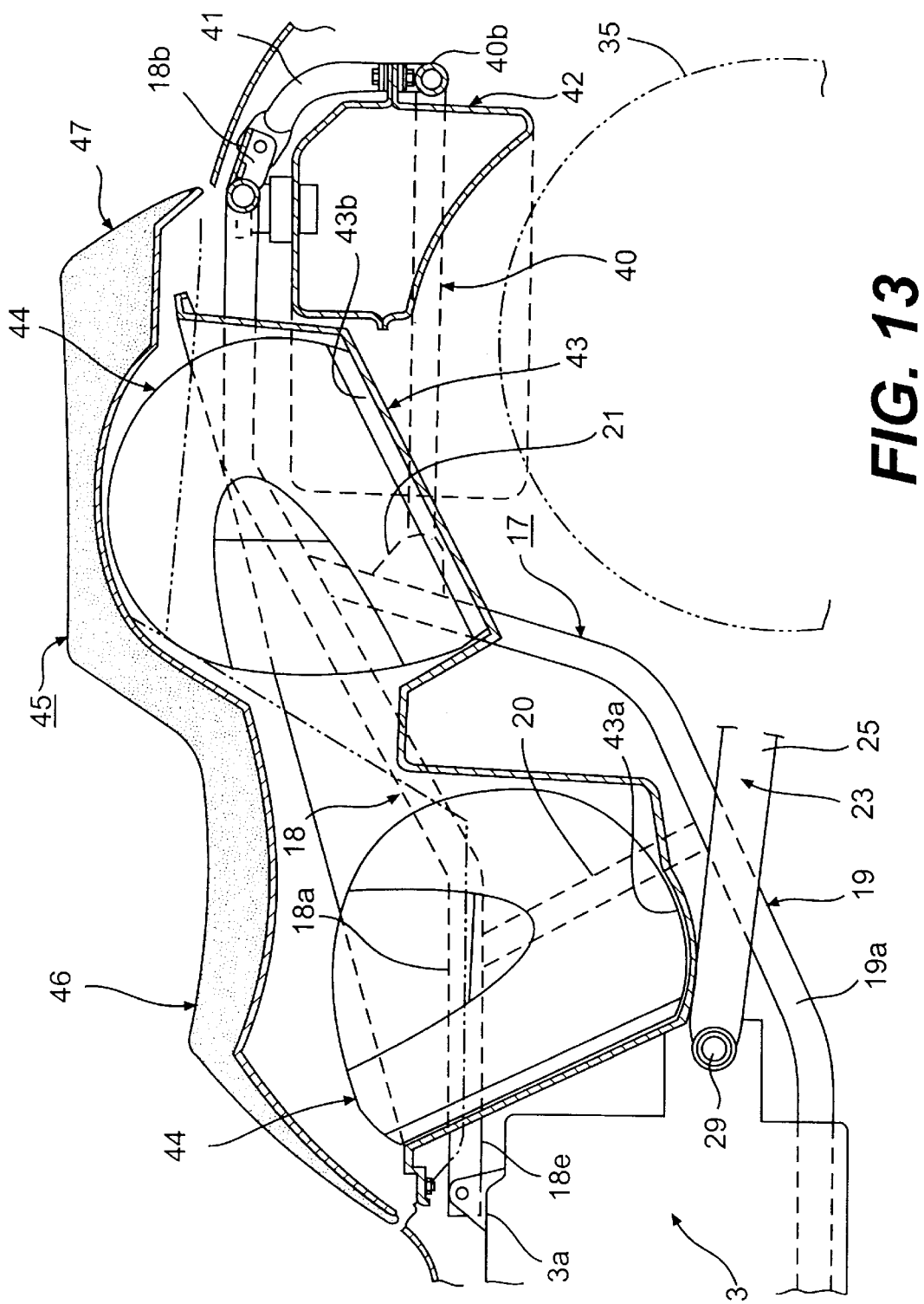
FIG. 13 is a sectional side view of a seat and storage box located in a rear part of the motorcycle.

As shown in FIG. 13, a storage box 43 is positioned between the rear end of the transmission casing 3 and the rear end of the rear frame 17. The storage box 43 is inclined upward toward the rear part of the motorcycle. When viewed from above, the storage box 43 is in the shape of an ellipse with its longer side being present along the length of the motorcycle, as shown in FIG. 2. Also, the storage box 43 has front and rear storage spaces 43a and 43b. The front storage space 43a is at a level lower than that of the rear storage space 43b.

The front storage space 43a is deeper than the rear storage space 43b. This enables a helmet 44 to be housed with its top facing rearward and its visor portion facing upward. The rear storage space 43b is present above the rear wheel 35. The rear storage space 43b houses a helmet with its top facing upward and its visor portion facing forward.

The front storage space 43a is present behind the transmission casing 3 and in front of the rear wheel 35. The rear storage space 43b is at a position higher than the front storage space 43a. The storage box 43 has an open top and is covered by a seat 45, so that it can be opened or closed as desired. The seat 43 includes a rider seat part 46, and a passenger seat part 47 behind the rider seat part 46. These seat parts 45 and 46 are integral. The seat 45 is moved upward or downward using one side thereof as a hinge, not shown, in order to open or close the front and rear storage spaces 43a and 43b.

Figure 8:
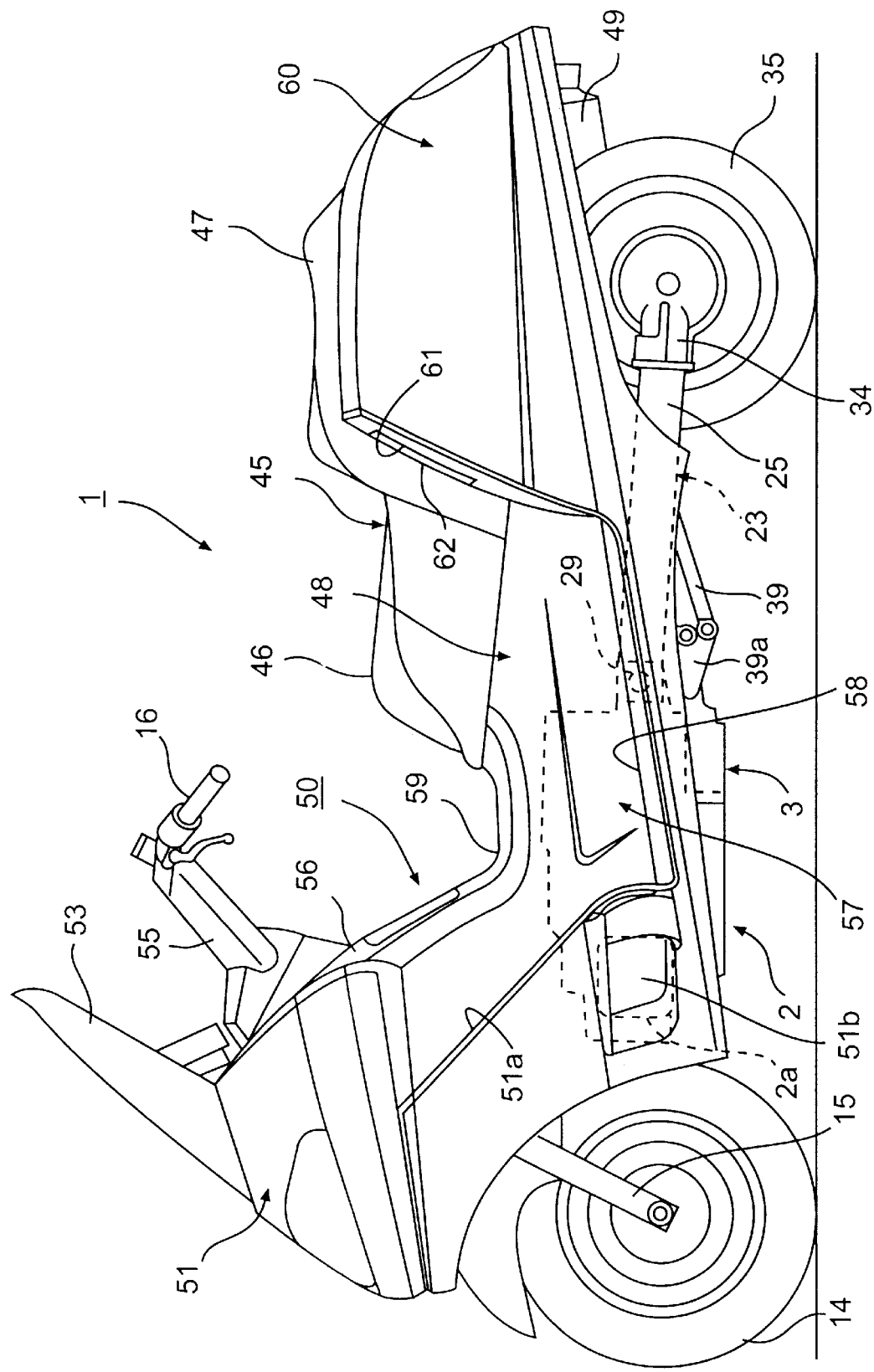
FIG. 8 is a side view showing an external appearance of the motorcycle.
Figure 9:
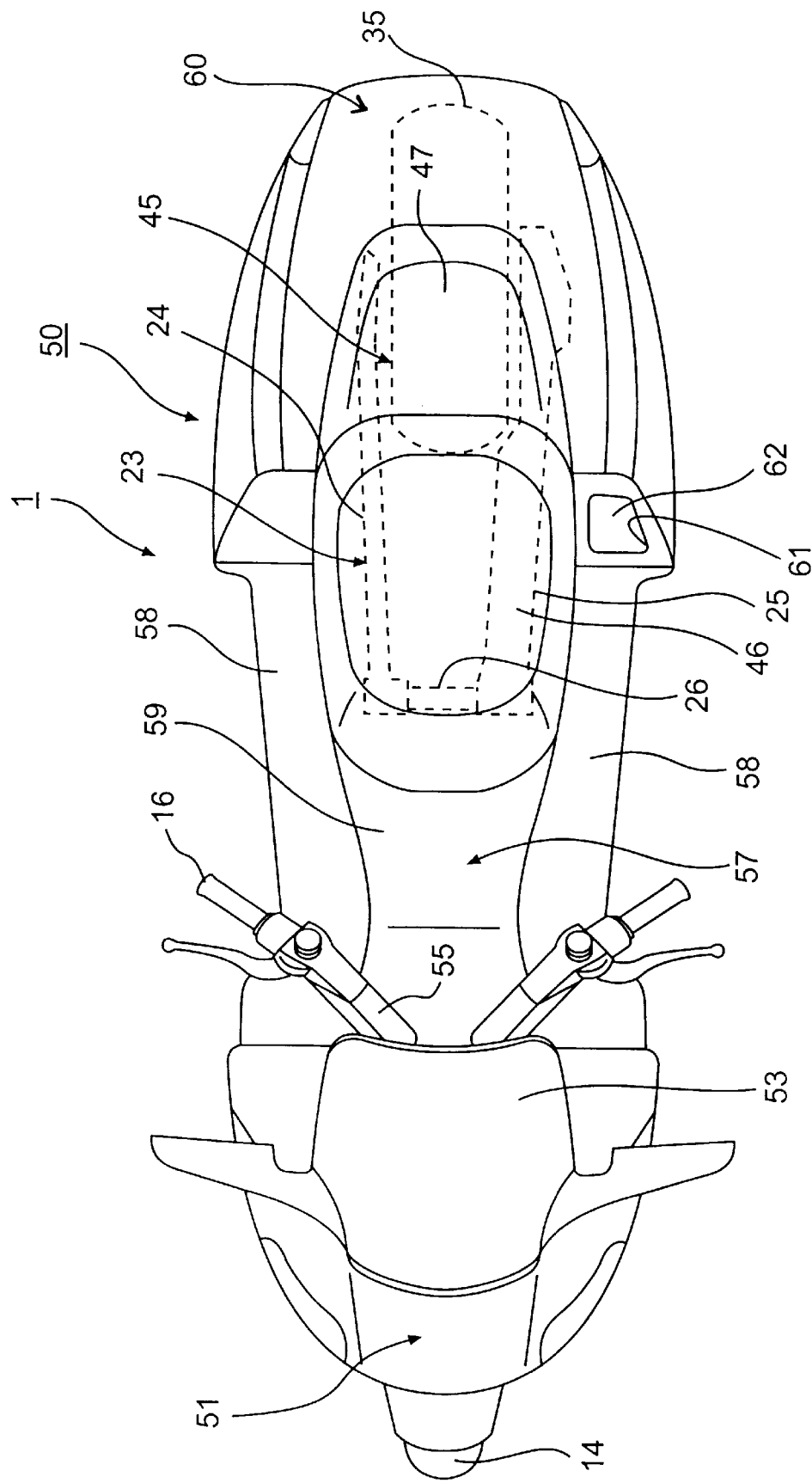
FIG. 9 is an overhead view of the motorcycle in FIG. 8.

The components constituting the body frame of the motorcycle are covered with a body cover 50 structured as shown in FIGS. 8 and 9. A front part 51 of the body cover 50 covers the engine 2 at the lower part of the body frame, opposite sides of the front frame 4, and a part under and behind the steering handle bar 16.

A windshield 53 extends upward from the front part 51 of the body cover 50. Further, a pair of leg shields 51a extend downward from the front part 51 to front ends of the footboards 58. The cylinder portion 2a of the engine 2 is positioned in front of the intersection of the footboards 58 and the leg shields 51a.

In FIG. 8, reference numeral 51b denotes an opening for the cylinder portions 2a. The body cover 50 has a lower part thereof positioned behind the front wheel 14, thereby covering opposite sides of the engine 2. Further, the front part 50 includes a handle cover 55 surrounding the steering handle bar 16, and a handle post cover 56.

Figure 10:
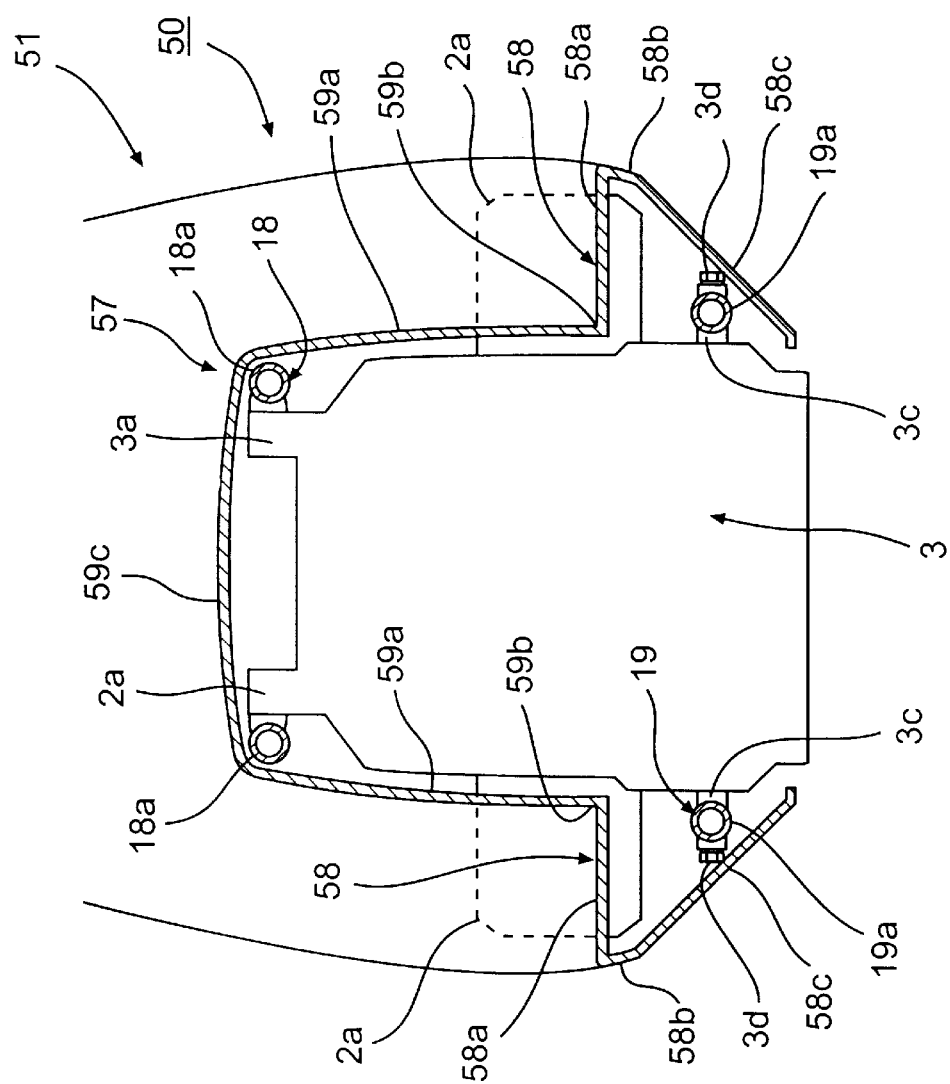
FIG. 10 is a sectional view taken along line 10—10 in FIG. 1.
Figure 11:
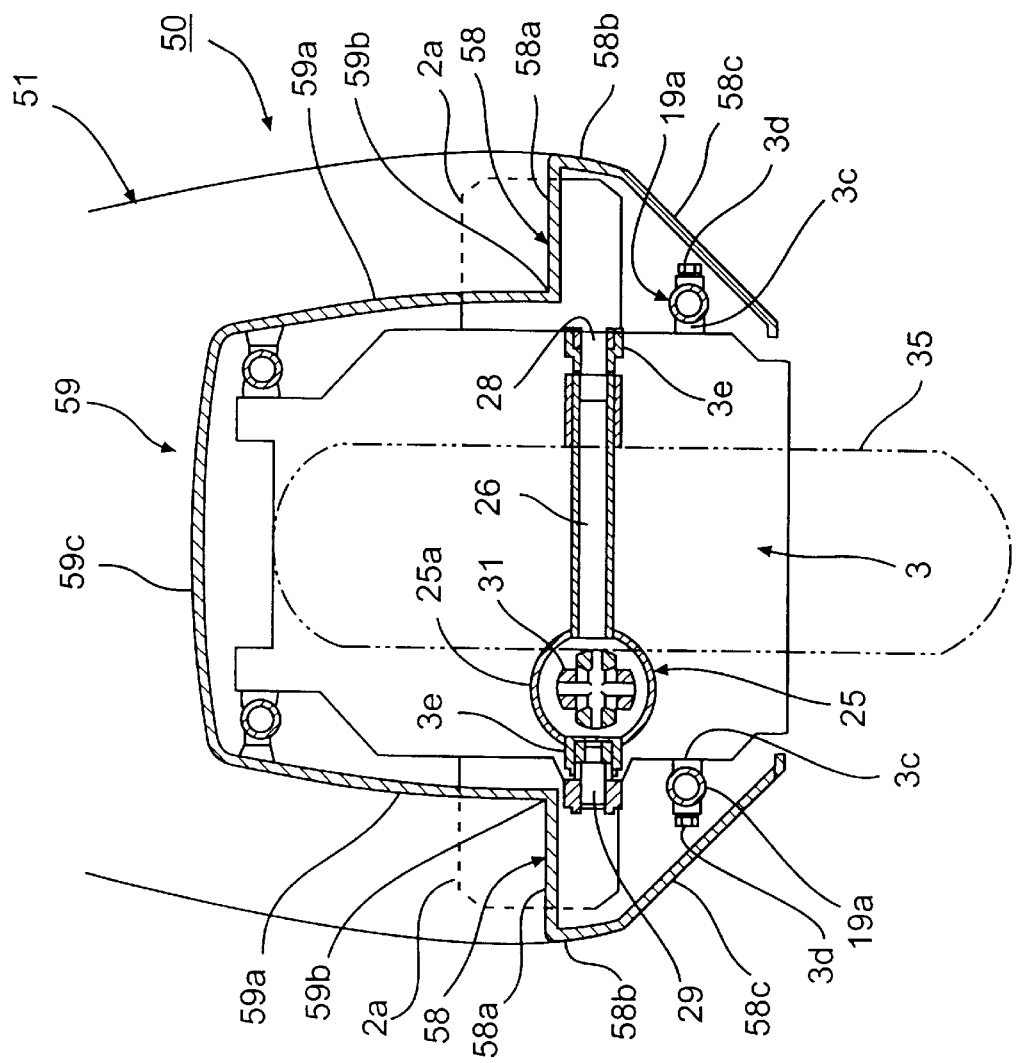
FIG. 11 is a sectional view taken along line 11—11 in FIG. 1.
Figure 12:
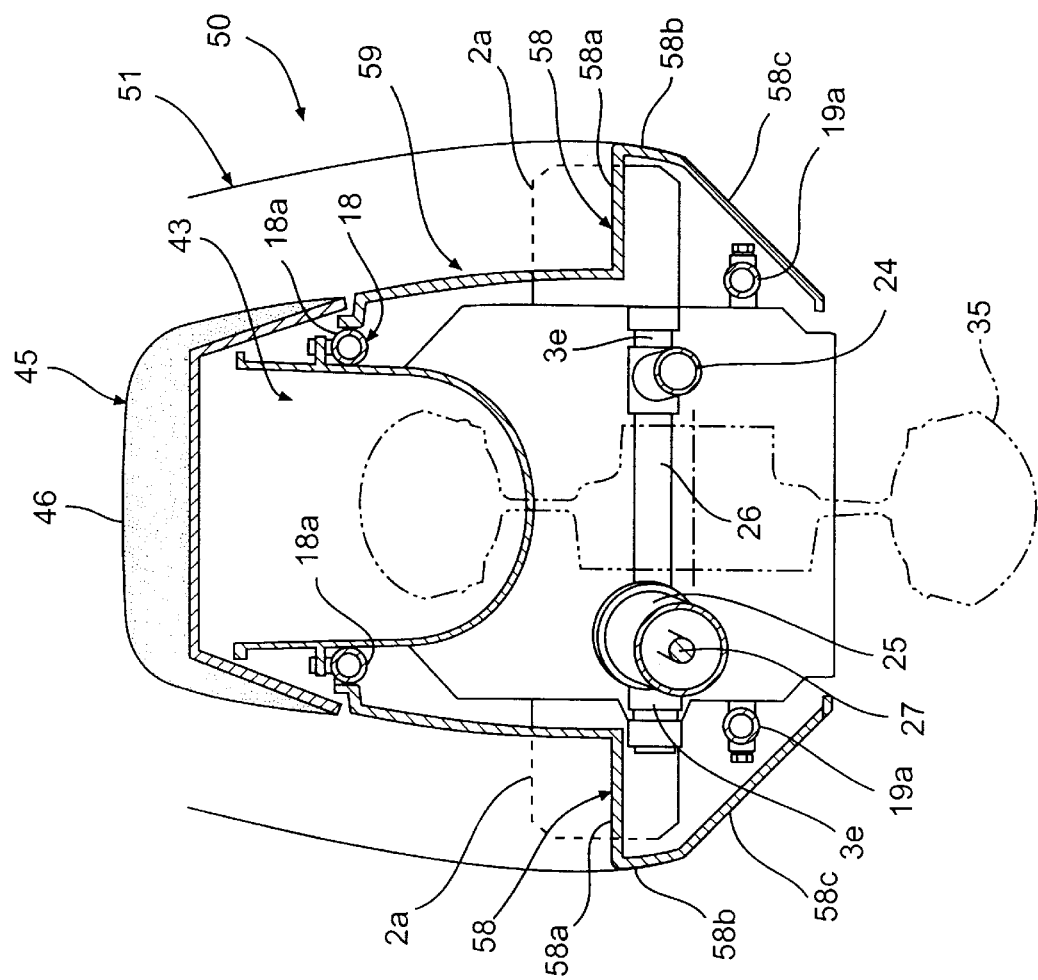
FIG. 12 is a sectional view taken along line 12—12 in FIG. 1.

A center portion 57 of the body cover 50 extends to the front part 51, without interruption, from an area near the engine 2 and the transmission casing 3. The center portion 57 is shaped as shown in FIGS. 10 to 12, and includes the footboards 58, and a floor tunnel 59 substantially in the shape of an inverted letter U. Lower ends of a pair of left and right side walls 59a of the tunnel 59 extend to the left and right footrests 58a at the opposite side edges of the footboards 58. The footrests 58a are slightly inclined downward, and side edges 58b of the footrests 58a are symmetrically folded downward and inward so that they form a pair of sidewalls 58c.

An upper half of the transmission casing 3 is housed in the floor tunnel 59, and is surrounded by an upper wall 59c and the pair of left and right side walls 59a. Since there is no body frame above the transmission casing 3, the floor tunnel 59 is required to simply cover the upper part and sides of the transmission casing 3, and it is therefore possible to maintain the floor tunnel 59 as low as possible.

The footboards 58 are positioned on the opposite sides of the transmission casing 3, and do not interfere with the front and rear frames 4 and 17, so that the footrests 58a can be made as wide as possible within the width of the motorcycle. Further, the footboards 58 are free from any interference from the front and rear frames 4 and 17 along the length of the motorcycle, so that the footboards 58 can be made as long as possible. This is effective in enlarging footrests for a passenger on the rear seat.

Referring to FIG. 11, the distance between the support shafts 28 and 29 of the swing arm 23 is small as described with respect to FIG. 7, so that the swing arm 23 can be arranged in the floor tunnel 59 defined by the footboards 58. The left and right swing arm members 24 and 25 fan out rearward, as clearly shown in FIG. 12.

A rear part 60 of the body cover 50 is arranged downstream of the center part 57. The rear part 60 of the body cover 50 covers an area around the seat 45, opposite sides and rear parts of the rear frame 17, upper half of the rear wheel 35, rear half of the swing arm 23, and an area around the storage box 43, and so on. A tool storage section 61 is provided on one side of the rear part 60 of the body cover 50 and behind one of the footboards 58, and opened or closed using a lid 62 in order to store or take out tools. In FIGS. 1 and 2, reference numeral 49 denotes a muffler extending rearward from one side of the body frame.

Figure 14:
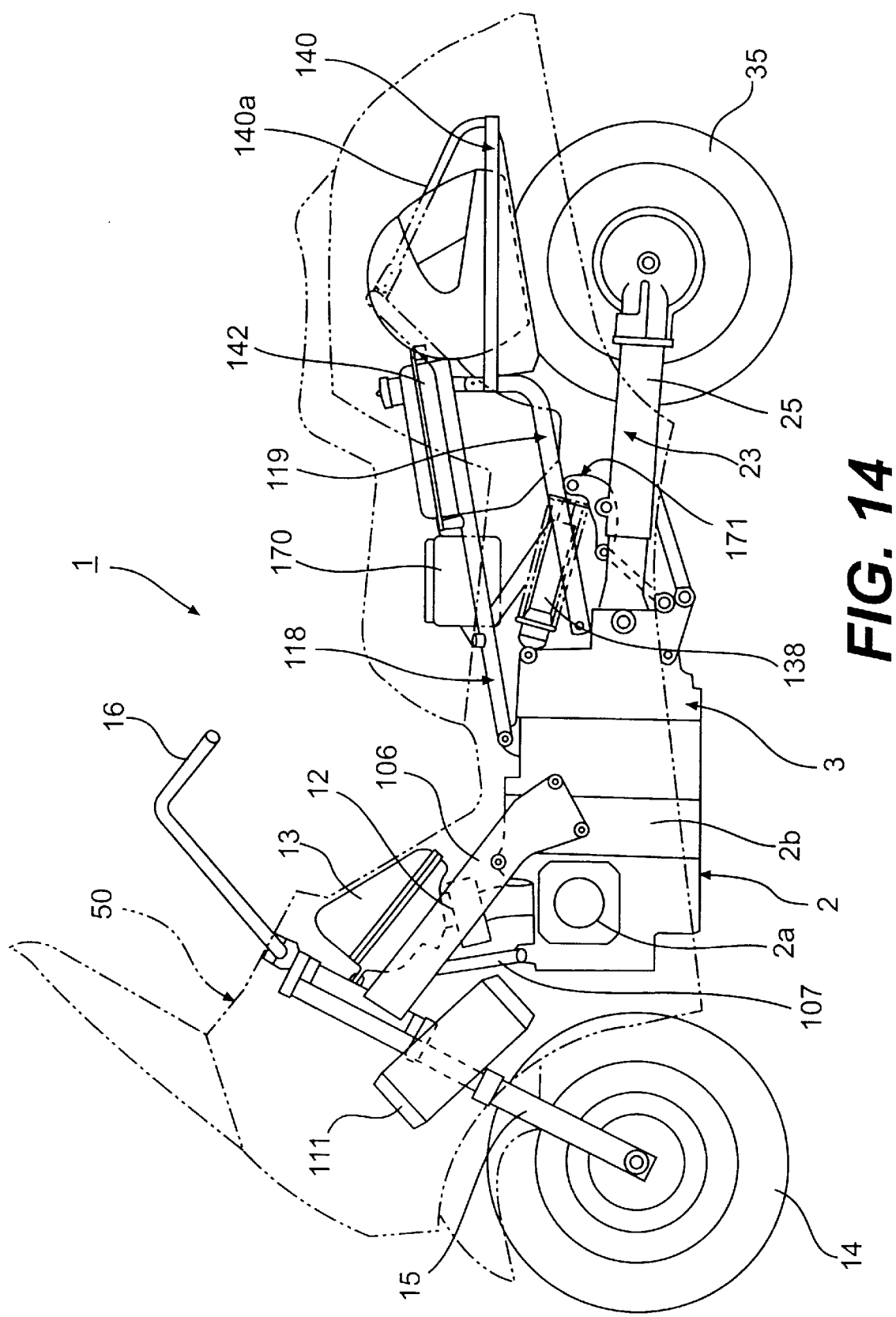
FIG. 14 is a side view similar to FIG. 1, showing a motorcycle in accordance with a second embodiment of the present invention.
Figure 15:
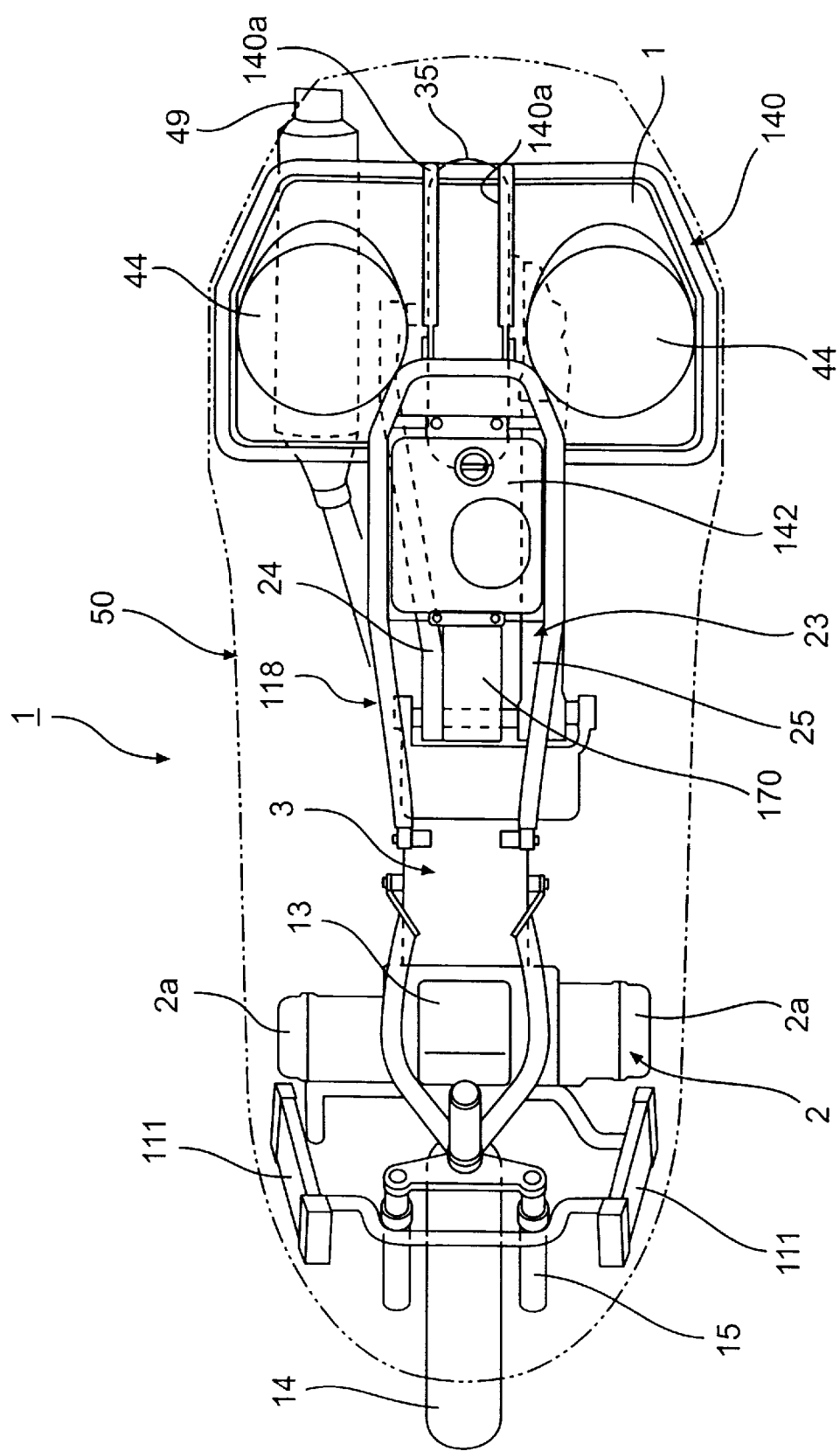
FIG. 15 is an overhead view of the motorcycle in FIG. 14.

A second embodiment of the invention is shown in FIGS. 14 and 15. The basic configuration of this embodiment is identical to that of the foregoing embodiment, and will not be described in detail. Identical components have identical reference numerals to those of the first embodiment.

A down tube 107 is substantially vertical in the second embodiment. A main pipe 106 is widened at its lower end, and is coupled to the body 2*b* of the engine 2. An upper sub-frame 118 of a rear frame 117 is straight, is inclined upward and rearward, and is made to stand up at the rear end thereof. A lower sub-frame 119 of the rear frame 117 is substantially in the shape of letter L. A battery 170 and a fuel tank 142 are housed in a substantially U-shaped space of the rear frame 117, e.g. the battery 170 is at the front part, and the fuel tank 142 is behind the battery 170.

As clearly shown in FIG. 15, a frame 140 is provided behind the rear frame 117 in accordance with the shape of the rear part of the body frame in order to define a space for receiving a storage box 143 therein. The frame 140 is coupled at its center to the rear end of the upper sub-frame 118 using a pair of stays 140*a* provided between the center and rear part of the frame 140. Thus, the wide storage box 143 is housed in the frame 140, so that two helmets 44 may be separately stored in left and right portions of the storage box 143.

Figure 16:
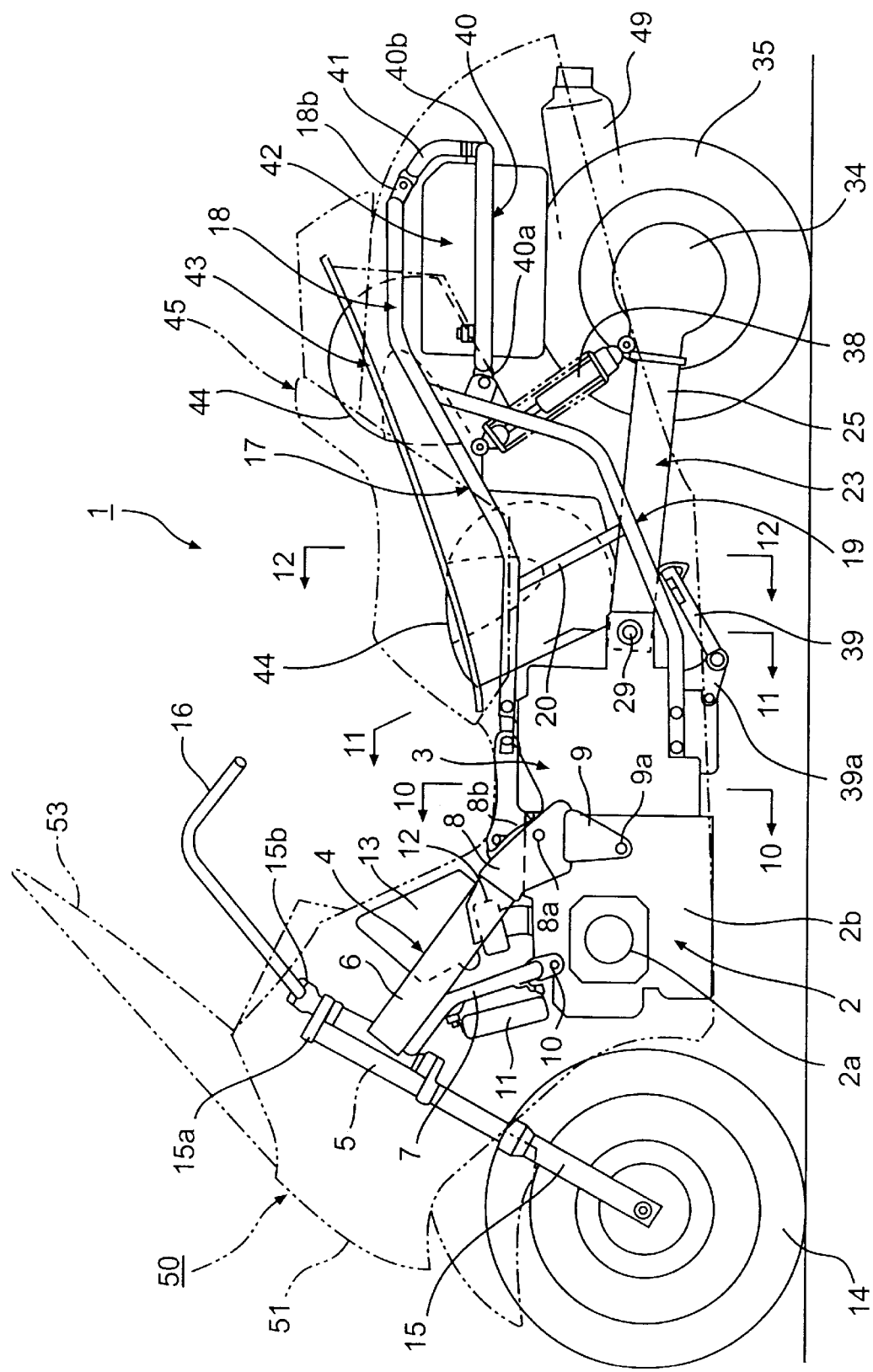
FIG. 16 is a side view similar to FIG. 1, showing a motorcycle in accordance with a third embodiment of the present invention.

Although the above embodiments have illustrated the front frame 4 as being a separate frame from the rear frame 17 or 117, it should be understood that the engine bracket 8 at the rear end of the front frame 4 could be coupled to the front end of the rear frame 17 or 117 using a bracket 8*b*. As illustrated in FIG. 16, in this case, the front and rear frames 4 and 17 or 117 are integral, and can be easily assembled on the manufacturing line.

The swing arm 23 is installed using a suspension including a buffer 138 which is coupled at one end to the upper rear part of the transmission casing 3 and at its other end to a progressive link mechanism 171. This is effective in gradually increasing cushion characteristics of the swing arm 23. As shown in FIG. 15, the radiators 111 are arranged at the opposite sides of the front folk 15. The other features of the second embodiment are identical to those of the first embodiment.

When a motorcycle, such as a scooter, is constructed in a manner consistent with the present invention, the motorcycle includes: the floor tunnel present at the center of the motorcycle and extending along the length of the motorcycle; the low footboards having footrests arranged at the opposite sides thereof; the horizontally opposed engine having the cylinder portion extending along the width of the motorcycle, the engine being positioned in front of the footboards; the transmission casing arranged behind the engine so as to be integral therewith and housed in the floor tunnel defined by the footboards; the front frame attached to and supported by the rear end of the engine; and the swing arm swingably supported by the rear end of the transmission casing in order to support the rear wheel. Therefore, the front frame is supported by the engine, and does not extend to the rear part of the footboards.

The front frame neither affects nor interferes with the footboards, so that the footboards can be made as wide and as long as possible within the width and length of the motorcycle.

Therefore, it is possible to provide a low floor on the scooter, which enables the rider to get on the motorcycle easily and place his or her feet on the footrests comfortably. Further, the low stance of the footrests improves the drive pleasure of the operator and the riding pleasure of the passenger. The footboards can be made long and wide, which is effective in enabling a passenger to comfortably place his or her feet on the passenger footrests and to enjoy comfortable riding on a dual-seat motorcycle which has previously suffered from a number of space restrictions.

The transmission casing is housed in the floor tunnel, which is effective in improving the external appearance of the motorcycle. The swing arm is arranged behind the transmission casing housed in the floor tunnel, which enables the swing arm to be at as low a position as possible. This arrangement is effective in enlarging the footboards without being affected by the support of the swing arm, in addition to the foregoing features.

Also in accordance with the present invention, the motorcycle includes a frame body comprising split front and rear frames. The rear frame is positioned behind the transmission casing, so that no frame components are arranged in the floor tunnel defined by the footboards. Therefore, the footboards are low enough for the rider to step over them without any problem.

The invention is effective in providing a motorcycle, such as a scooter, having excellent ease of use and ease of mounting and dismounting. The front and rear frames are separate from each other, so that the front frame is attached via its rear end with the engine while the rear frame is supported by the transmission casing. Therefore, the front and rear frames are coupled not directly but via the engine and the transmission casing, both of which constitute important parts of the body frame. This simplifies and strengthens the structure of the body frame without the use of any reinforcing members, and is effective in reducing the number of components, and in simplifying and facilitating the manufacture of the motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A motorcycle comprising:
   a front frame located in a forward portion of the motorcycle;
   a rear frame located in a rearward portion of the motorcycle;

an engine for powering the motorcycle;

a transmission case coupled to said engine and located rearward of said engine;

a pair of footboards located on opposite sides of the motorcycle;

a floor tunnel covering said transmission case; and a swing arm supporting a rear wheel of the motorcycle, wherein said front frame is directly coupled to a rearward portion of said engine such that said footboards are low enough to ensure ease of mounting and dismounting of the motorcycle, and wherein said swing arm is swingably connected to said transmission case.

2. The motorcycle according to claim 1, wherein said front frame is separate from said rear frame, and said rear frame is coupled to said transmission case.

3. The motorcycle according to claim 2, wherein said rear frame is coupled to a rear portion of said transmission case.

4. The motorcycle according to claim 1, further comprising a bracket coupling said front frame to said rear frame.

5. The motorcycle according to claim 4, wherein said rear frame is coupled to a rear portion of said transmission case.

6. The motorcycle according to claim 1, wherein said engine includes a pair of cylinders, said pair of cylinders being horizontally opposed so as to reciprocate in a widthwise direction of the motorcycle.

7. The motorcycle according to claim 6, wherein said engine is located forward of said pair of footboards.

8. The motorcycle according to claim 1, further comprising a shock absorber connecting said swing arm to said rear frame.

9. The motorcycle according to claim 1, wherein said motorcycle is a scooter.

10. The motorcycle according to claim 1, wherein said transmission case and a case for said engine are integrally formed.

11. The motorcycle according to claim 1, further comprising a helmet storage container, a fuel tank, and a battery within said rear frame.

12. A motorcycle comprising:

a front frame located in a forward portion of the motorcycle;

a rear frame located in a rearward portion of the motorcycle;

an engine for powering the motorcycle;

a transmission case coupled to said engine and located rearward of said engine;

a pair of floorboards located on opposite sides of the motorcycle;

a floor tunnel covering said transmission case; and a swing arm supporting a rear wheel of the motorcycle, wherein said front frame is directly coupled to a rearward portion of said engine, said swing arm is swingably connected to a rear end of said transmission case, and said rear frame is directly coupled to a rear portion of said transmission case such that said floorboards are low enough to ensure ease of mounting and dismounting of the motorcycle.

13. The motorcycle according to claim 12, further comprising a bracket coupling said front frame to said rear frame.

14. The motorcycle according to claim 12, wherein said engine includes a pair of cylinders, said pair of cylinders being horizontally opposed so as to reciprocate in a widthwise direction of the motorcycle.

15. The motorcycle according to claim 12, wherein said engine is located forward of said pair of footboards.

16. The motorcycle according to claim 12, further comprising a shock absorber connecting said swing arm to said rear frame.

17. The motorcycle according to claim 12, wherein said motorcycle is a scooter.

18. The motorcycle according to claim 12, wherein said transmission case and a case for said engine are integrally formed.

19. A scooter comprising:

a front frame located in a forward portion of the scooter;

a rear frame located in a rearward portion of the scooter;

a horizontally opposed engine with an engine casing for powering the scooter;

a transmission case integrally formed with said engine casing and located rearward of said engine;

a pair of floorboards located on opposite sides of the scooter and located forward of said engine;

a floor tunnel covering said transmission case; and a swing arm supporting a rear wheel of the scooter, wherein said front frame is directly coupled to a rear portion of said engine, said swing arm is swingably connected to a rear end of said transmission case, and said rear frame is directly coupled to a rear portion of said transmission case such that said floorboards are low enough to ensure ease of mounting and dismounting of the motorcycle.

20. The scooter according to claim 19, further comprising a bracket coupling said front frame to said rear frame.

\* \* \* \* \*